United States Patent [19]
Lopez

[11] Patent Number: 5,470,145
[45] Date of Patent: Nov. 28, 1995

[54] PROCESS AND APPARATUS FOR THE DISPERSION AND PROPORTIONING OF FIBERS USED IN THE BUILDING SECTOR IN GENERAL

[75] Inventor: Reyero Lopez, Madrid, Spain

[73] Assignee: Productos Bituminosos, S.A. (Probisa), Madrid, Spain

[21] Appl. No.: 995,368

[22] Filed: Dec. 23, 1992

[51] Int. Cl.$^6$ .............................. B01F 13/00; B01F 15/02
[52] U.S. Cl. .......................... 366/13; 366/102; 366/158.1
[58] Field of Search ................................. 366/20, 35, 158, 366/157, 156, 50, 38, 10, 101, 102, 13, 103

[56] References Cited

U.S. PATENT DOCUMENTS

| | | | |
|---|---|---|---|
| 858,017 | 6/1907 | Pence | 366/35 |
| 2,792,304 | 5/1957 | Pavan | 366/158 |
| 3,006,615 | 10/1961 | Mason | 366/20 |

FOREIGN PATENT DOCUMENTS 0344141  11/1989  European Pat. Off. .
0344382  12/1989  European Pat. Off. .
2603884   3/1988  France .

*Primary Examiner*—Robert W. Jenkins
*Attorney, Agent, or Firm*—Darby & Darby

[57] ABSTRACT

Process and apparatus for the dispersion and proportioning of fibers used in the building sector in general that consists of mechanical equipment equipped with feeding, stirring and proportioning systems, which may be operated electrically or hydraulically, applicable to both hot and cold bituminous mixes, having an air injection dispersion system, that may or may not be equipped with a vibrating motor with elastic joint between the hopper and the proportioning body. In the stirring and proportioning body there are two shafts, one of which is provided with blades to homogenize the fibers and the other one has a spindle independent from the first shaft, which rotates at a variable speed, the fiber-air blend passing through the dispersion tube which is smaller than the proportioning tube. The fiber mass is made to fall on some deflectors located at the disperser outlet and the assembly may be mounted in an immovable or movable manner.

11 Claims, 1 Drawing Sheet

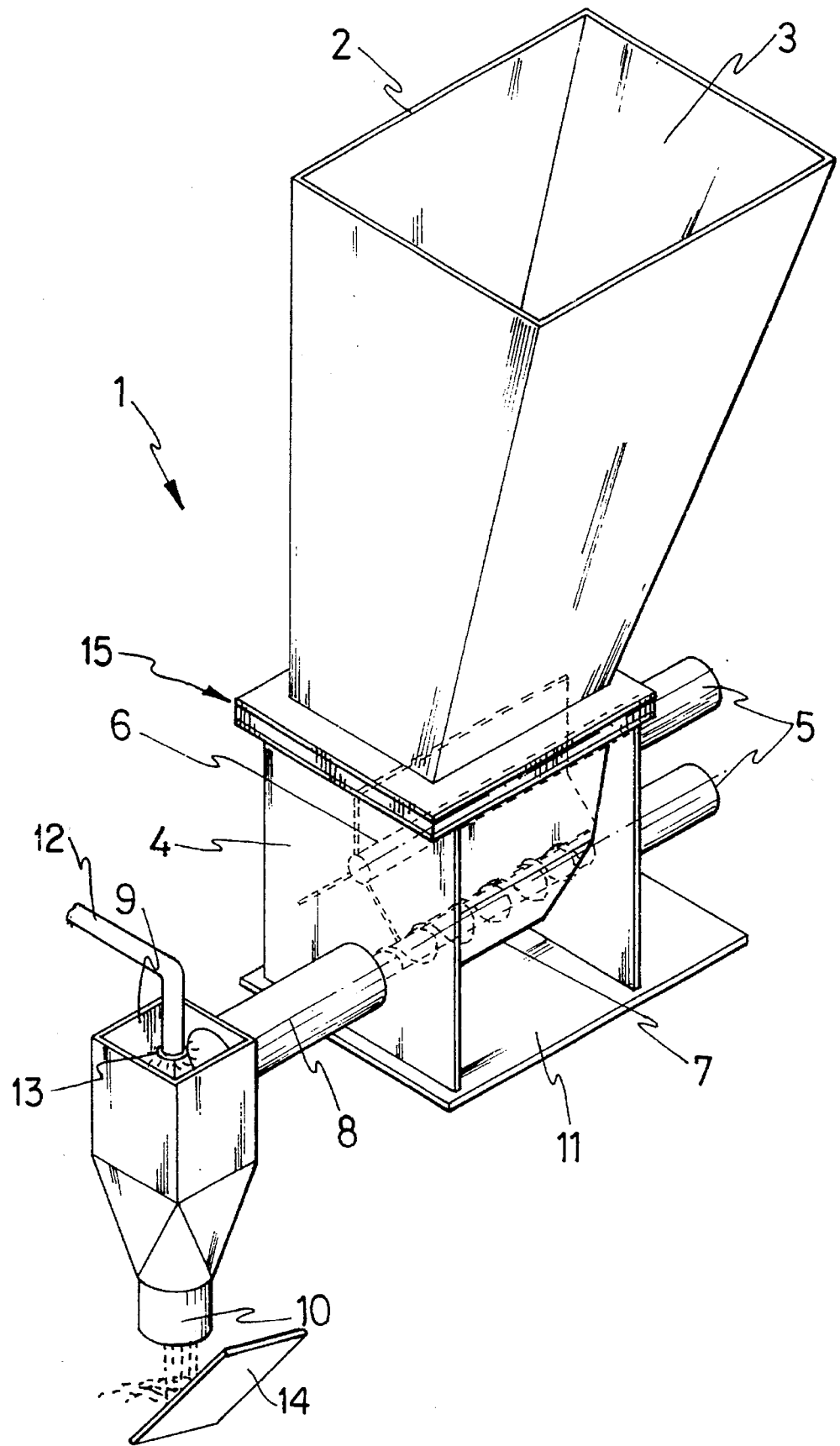

PROCESS AND APPARATUS FOR THE DISPERSION AND PROPORTIONING OF FIBERS USED IN THE BUILDING SECTOR IN GENERAL

OBJECT OF THE INVENTION

The present invention refers to a process and apparatus for the dispersion and proportioning of fibers used in the building sector in general, whose obvious purpose is to be a process that is applicable in the building sector in general comprising a process and equipment from which said fibers in the center of a mixture can be dispersed in a totally homogenous manner, guaranteeing the optimum proportioning of the same. It is capable of being used to form hot or cold bituminous mixes.

1. Field of the Invention

This invention is applicable in the industry dedicated to manufacturing and forming bituminous mix surfacings generally applicable in the building sector.

2. Background of the Invention

The existence of French patent number 2,615,520, applied for on 20 May 1987, which protects a bituminous composition for cold paving, is known, as well as the process to make said paving and the fiber proportioning device thereof to carry out said process at the work site.

Likewise, British patents numbers A-1 124,498 and 2,096,622, as well as U.S. Pat. No. 4,613,376 are known.

In all of these patents, in one way or another different processes and apparatus used to permit the forming of paving from bituminous compositions are protected. They are all done cold. In all of these cases the obtained forms are improved, without there being of course the slightest indication of interference in the processes protected in all of them.

However, the obvious solution to the problem existing at this time would be to be able to count on a process differing from the ones presently known, intended to permit the dispersion of fibers in which a maximum homogeneity of the dispersion will be ensured. This is something that has not yet been achieved. It would also achieve use of fibers that are not pretreated either physically or chemically and these fibers would be obtained from synthesis polymers.

Likewise, it would be ideal that the dispersion were made easier by the physical characteristics of the fiber itself and by the mechanical process that the process involves.

Besides, this process considered to be ideal should permit the possibility of allowing the use of rapid breakage emulsions with control agents, as well as slow breakage emulsions, consequently forming a broad spectrum mix proportioning process, compatible with modified bitumen emulsions. The fibers used should furnish resistance properties to the mixture, even when they are used in rainy climates.

Consequently, the process would permit a substantial reduction in the opening up to traffic times as it would have an installation which is either immovable or movable where the mix is made or produced. The entire process would be provided with a breakage retarder made from an organic or inorganic nitrogenated base, considerably improving the stability of the mixture and having a greater slipping resistance, greater durability and better cohesion.

However, up to now, the existence of a process and apparatus suitable to form the same and that has the conditions and advantages pointed out as optimum is unknown.

DESCRIPTION OF THE INVENTION

The process and apparatus for the dispersion and proportioning of fibers used in the building sector in general, intended to be used as it has been said above in the building sector in general that the invention proposes, is an obvious solution to the problem existing presently in this area. It includes numerous advantages that enhance the technique developed up to now.

More specifically, the process and apparatus for the dispersion and proportioning of fibers that are proposed, are comprised of manufacturing equipment that permits totally homogenous dispersion of the fibers in the center of the mix, guaranteeing optimum proportioning of the same. It is applicable to both hot and cold bituminous mixes.

The apparatus consists of mechanical equipment consisting of different feeding, stirring and proportioning elements, with electric or hydraulic operation.

The equipment has an air injection dispersion device.

The feeding device is made up of a hopper with enough capacity for each type of work to be done. The walls of this hopper are inclined with a sufficient angle to allow removal of the contents thereof.

The hopper may be provided with a vibrating motor and may have an elastic joint located between the hopper and the proportioning body itself, depending on the type of fiber that is going to be used.

The stirring and proportioning body consists of two shafts, one of which has blades and it is specifically intended to obtain homogenization of the fibers before they are affected by the operation of the second shaft, which really comprises the proprotioning spindle which is totally independent from the first shaft, provided with blades, rotating at a variable speed.

Just as it has been said above, the apparatus may be operated by an electric reducing engine or else by a hydraulic engine.

In the event that an electric reducing engine is used the adjustment is done electronically, while when an oleo-hydraulic or hydraulic engine is used, the adjustment will be achieved by means of including a flow proportioning valve.

The apparatus has a dispersing body that has a hopper, a disperser and an air injection system.

The apparatus operates by means of placing the fibers coming from the proportioning tube into the hopper, where these fibers are subjected to the action of compressed air which inevitably leads to the pneumatic opening of the bundles.

The fibers-air blend is passed through the dispersing tube that is smaller than the proportioning tube with the subsequent increase of speed of the entire fiber mass.

This mass falls upon some deflectors at the outlet of the disperser, attaining by impact action the total crumbling of any fiber bundle.

The assembly of the proportioning and dispersion of fiber equipment unit can be done in any type of installation, whether it is immovable or movable and it can be used for cold or hot mixes.

The installation must be done in such a way that the fibers are added to the dry elements of the mix and in this case to the aggregate plus the filler.

The fibers have been obtained from synthesis polymers and they have not received previous physical or chemical treatment.

Jointly, with the mechanical dispersion and proportioning process the physical characteristics themselves of the fibers used in the process defined here, facilitate the total dispersion of the same.

The following points must be taken into account in this process:

Weight between 1 200 dtex, whereby the unit dtex, is defined as the mass of a fiber 1000 m. long.

dtex/cutting length (mm) ratio very appropriate for an optimal dispersion.

The proportioning of fibers varies between 0.1 and 1.5% by weight of dry fibers with respect to the weight of the dry aggregate.

Slow breakage bituminous emulsions, as well as rapid breakage emulsions with retarders, will be used, taking for granted that the use of rapid breakage emulsions that are supplied in this process, make it possible to provide the suitable reactivity for rapid opening up to traffic.

The additives must be chosen in order to obtain a complete covering of the aggregates by the emulsion, aside from a good initial cohesion of the product.

Aside from this, the additives will be chosen in accordance with the characteristics of the aggregates and also with the climatic conditions.

The chemical nature of these control agents will be of organic or inorganic nitrogenated bases.

The mixing can be done with pure bitumen emulsions or emulsions of bitumen modified with polymers or elastomers, either of synthesis or natural ones.

The aggregates used have a granulometric curve between the officially specified limits for each type of mix, preferably using a granulometry between 0 and 14 mm. with a discontinuity between 2 and 6 mm. or a double continuity between 2 and 4 mm. and between 6 and 10 mm.

A granulometry between 0 and 10 mm. with a discontinuity between 2 and 6 mm., or else a discontinuous granulometry between 0 and 6 mm. with a discontinuity between 2 and 4 mm. may be used.

In consequence with what has been specified above, the process defined here constitutes appropriate treatment for any type of traffic, considerably improving with the fibers the cohesion as well as the consistency of the mix.

A very high macrotexture and drainability and an excellent adherence between the tire and the paving are obtained. It is also possible to waterproof the old foundation as there is a good cost/effectiveness ratio.

The fibers used in this system improve the resistance of the mix in the face of microorganisms attack and make it highly resistant to degradation by the action of sunlight, which are determining factors of the aging of the paving.

Likewise, a significant reduction of the structural fatigue of the foundation is achieved due to the low water sensitivity that the fiber provides even in areas with heavy rainfall, improving the stability of the mix, slipping resistance and durability.

DESCRIPTION OF THE DRAWINGS

In order to complete the description that is being made and for the purpose of providing a better understanding of the features of the invention, a single sheet of drawings, on which the following has been represented in an illustrative and non-restrictive manner, has been attached to the present specification as an integral part thereof:

Sole FIGURE.—It shows a view of the device from which the process for the dispersion and proportioning of fibers, used and applied in the building sector in general, is carried out.

PREFERRED EMBODIMENT OF THE INVENTION

In view of this figure, one can see how the process and apparatus for dispersion and proportioning of fibers used in the building sector in general that the invention proposes, consists of the use of mechanical equipment (1), which is provided with a hopper (2) that has a broad mouth (3). All of the sides of the hopper itself (2) are provided with a suitable slope in order to permit the ideal drop of the material therein.

The hopper (2) is provided with enough capacity to carry out every type of work, and in all cases the same will have a slope of its side walls for the purpose of furnishing the release of the same.

The fibers coming from the proportioning tube, in which they will be subjected to the action of compressed air that leads to the pneumatic opening of the bundles, will be placed in this hopper.

The fibers-air blend is passed through the dispersion tube (10) which is smaller than the proportioning tube (8), with the subsequent increase of speed of the entire fiber mass.

This mass is made to fall on some deflectors (14) at the outlet of the disperser (10), attaining by impact action the total crumbling of any fiber bundle.

In short, it can be said that the apparatus is provided in the lower part of the hopper with a stirring and proportioning body (5), which consists of two shafts (6) and (7), shaft (6) having some blades which achieve homogenization of the fibers before they are affected by the action of the second shaft (7), which is provided with the pertinent proportioning spindle which is totally independent from the first shaft (6), which rotates at a variable speed.

The operation of the shafts (6) and (7) can be achieved by means of an electric reducing engine or else a hydraulic engine. In the event that the operation is by means of an electric reducing engine the adjustment will be done electronically, while in the case of the use of a hydraulic engine for operation of the shafts (6) and (7), adjustment will be done by means of a flow proportioning valve.

Once the fibers have been adequately treated, they emerge through a duct (8) which will take them to a hopper (9), provided with its corresponding dispersing mouth (10) and thanks to the action of an air injection system connected by the duct (8), the fibers will be adequately treated. The injection system includes an air injection tube (12) having an outlet nozzle (13) adjacent to duct (8).

The entire unit is mounted on a base on which the chassis or frame (11) rests.

This apparatus, along with the corresponding above described process, forms and achieves the dispersion and proportioning of the fibers.

It is considered unnecessary to make this description any more extensive in order for any expert in the matter to understand the scope of the invention and the advantages that are derived from the same.

The materials, form, size and arrangement of the parts can be varied as long as this does not imply an alteration of the essentialness of the invention.

The terms in which this specification has been described should always be taken in a broad and non-restrictive sense.

I claim:

1. An apparatus for dispersing and dosing fibers used in the building sector and for attaining a homogeneous dispersion of the fibers in a bituminous mix, comprising:

feeding means, having inclined side walls, to feed said fibers into the apparatus;

means for stirring to prevent said fibers from compacting and to achieve their homogenization, said means for stirring being arranged below said feeding means and receiving said fibers from said feeding means;

means for conveying dosed quantities of said fibers to be introduced into said mix, arranged adjacent said stirring means;

a housing enclosing said conveying and stirring means;

an air injection fiber dispersion system for homogeneously dispersing a plurality of bundles of fibers, said dispersion system receiving fibers from said means for conveying; and means for driving tile means for stirring and means for conveying of the apparatus.

2. Apparatus according to claim 1 wherein said feeding means is a hopper.

3. Apparatus according to claim 2 wherein said hopper is interchangeable to allow the use of hoppers of different size to feed the fibers into the apparatus.

4. Apparatus according to claim 1 wherein:

said means for stirring comprises a first shaft provided with blades, said means for conveying comprises a screw conveyor mounted on a second shaft, and said first and second shafts are operated independently.

5. Apparatus according to claim 4 wherein said means for stirring additionally comprises:

an elastic joint between said hopper and said conveying and stirring housing.

6. Apparatus according to claim 4 wherein the speed of said shafts is electronically adjusted.

7. Apparatus according to claim 4 wherein the speed of said shafts is adjusted by means of a flow proportioning valve.

8. Apparatus according to claim 4 wherein said air injection fiber dispersion system comprises a proportioning tube, a second hopper located at the exit of said proportioning tube, the fibers being directed through said proportioning tube and into said second hopper by said conveying means which includes a screw conveyor.

9. Apparatus according to claim 8 wherein said air injection fiber dispersion system additionally comprises at least one compressed air source to inject air onto the fibers coming from said proportioning tube and into said second hopper so as to further disperse said fibers.

10. Apparatus according to claim 9 wherein said air injection fiber dispersion system additionally comprises:

a dispersion tube located at the exit of said second hopper and whose cross section is smaller than that of said proportioning tube to increase the flow speed of the fiber mass, means for deflecting located at the outlet of said dispersion tube to separate said fiber bundles due to the impact force applied upon said fibers when they hit said means for deflecting.

11. Apparatus according to claim 1 wherein said means for driving comprises at least one electric motor.

* * * * *

UNITED STATES PATENT AND TRADEMARK OFFICE
CERTIFICATE OF CORRECTION

PATENT NO. : 5,470,145
DATED : November 28, 1995
INVENTOR(S) : Miguel A. REYERO LOPEZ It is certified that error appears in the above-indentified patent and that said Letters Patent is hereby corrected as shown below:

Title page, [75], Inventor:, change "Reyero Lopez" to --Miguel A. REYERO LOPEZ--.

Item [19] should read --Reyero-Lopez--.

Signed and Sealed this

Twentieth Day of February, 1996

Attest:

BRUCE LEHMAN

Attesting Officer   Commissioner of Patents and Trademarks